United States Patent
Cassity et al.

(10) Patent No.: US 9,535,409 B1
(45) Date of Patent: Jan. 3, 2017

(54) ADVANCED CONTROL OF A MULTIPLE RECEIVER CONCENTRATED SOLAR POWER PLANT

(71) Applicant: eSolar Inc., Burbank, CA (US)

(72) Inventors: William Dwight Cassity, Pahrump, NV (US); Andrew John Zillmer, Studio City, CA (US); Michael Slack, South Pasadena, CA (US)

(73) Assignee: ESOLAR INC., Burbank, CA (US)

( * ) Notice: Subject to any disclaimer, the term of this patent is extended or adjusted under 35 U.S.C. 154(b) by 676 days.

(21) Appl. No.: 14/064,036

(22) Filed: Oct. 25, 2013

Related U.S. Application Data (60) Provisional application No. 61/718,928, filed on Oct. 26, 2012.

(51) Int. Cl.
*G05D 3/12* (2006.01)
*G05B 15/02* (2006.01)

(52) U.S. Cl.
CPC .................... *G05B 15/02* (2013.01)

(58) Field of Classification Search
None
See application file for complete search history.

(56) References Cited

U.S. PATENT DOCUMENTS

| | | | | |
|---|---|---|---|---|
| 8,125,214 B1* | 2/2012 | Steingart | ............. | G01R 15/202 |
| | | | | 324/117 H |
| 8,417,391 B1* | 4/2013 | Rombouts | ............. | G05B 13/02 |
| | | | | 700/286 |
| 8,763,397 B1* | 7/2014 | Meduri | ................... | F01K 13/02 |
| | | | | 126/572 |
| 2004/0002786 A1* | 1/2004 | Sasaki | ................. | D21G 9/0036 |
| | | | | 700/127 |
| 2005/0039787 A1* | 2/2005 | Bing | ....................... | G01W 1/10 |
| | | | | 136/243 |
| 2011/0066401 A1* | 3/2011 | Yang | ...................... | G01J 1/4228 |
| | | | | 702/184 |
| 2011/0100004 A1* | 5/2011 | Al-Mazeedi | ......... | G05B 13/021 |
| | | | | 60/641.8 |
| 2011/0126824 A1* | 6/2011 | Conlon | .................. | F22B 1/006 |
| | | | | 126/601 |
| 2011/0277981 A1* | 11/2011 | Muthuramalingam | | B01D 53/1425 |
| | | | | 165/200 |
| 2012/0155594 A1* | 6/2012 | Malloy | .................... | G21C 7/32 |
| | | | | 376/210 |
| 2014/0090456 A1* | 4/2014 | Meisner | ............... | G01M 15/14 |
| | | | | 73/112.01 |
| 2014/0120445 A1* | 5/2014 | Mussro | ............. | H01M 8/04992 |
| | | | | 429/444 |

* cited by examiner

*Primary Examiner* — Adam Lee
(74) *Attorney, Agent, or Firm* — Brooks Acordia IP Law, P.C.; Pejman Yedidsion (57) ABSTRACT

Methods and systems for optimizing the startup, shutdown, and running operation of a multiple receiver concentrated solar power (CSP) plant comprising a predicted variable from at least one receiver model, a predicted variable from a plant model, and a determined target from an optimizer based on the predicted variable from the at least one receiver model and the predicted variable from the plant model.

18 Claims, 4 Drawing Sheets

ADVANCED CONTROL OF A MULTIPLE RECEIVER CONCENTRATED SOLAR POWER PLANT

CROSS-REFERENCE TO RELATED APPLICATION

This application claims priority to and the benefit of U.S. Provisional Patent Application Ser. No. 61/718,928, filed Oct. 26, 2012, which is hereby incorporated herein by reference in its entirety for all purposes.

FIELD OF ENDEAVOR

The invention relates to the field of operation of a power generating plant with multiple solar receivers and more particularly, to methods and devices for controlling and optimizing a power plant with multiple solar receivers using advanced control techniques which may include optimization, modeling, and model predictive control (MPC).

BACKGROUND

The recent boom in renewable energy has given rise to power plants whose fuel source is the Sun. Some plants, for example, concentrated solar power (CSP) plants, use multiple solar receivers with associated heliostat fields distributed over large geographical areas to produce steam. A commercial CSP plant might consist of ten or more receivers, each powered by a field of 20,000 to 30,000 heliostats. Steam produced by the receivers is piped to a power block that may include a steam turbine generator (STG), or to another steam consumer, e.g., a combined cycle plant.

Due to varying amounts of flux throughout the course of a day, a CSP plant will start up and shut down daily. The startup time for a CSP plant may, for example, be as high as two hours per day, which means that 20% of all available operating hours may be devoted to startup. Startup time may be further delayed by variables such as ambient temperature, wind, and clouds.

Once a CSP plant is running and generating power, it is still vulnerable to load swings during the running operation due to using the Sun as a power source. Changes in the weather, especially clouds, can have large effects on plant operation. For example, a cloud transient may reduce or increase power delivery by 80% or more in only a few minutes. A CSP plant may even become unstable as a result of a rapid oscillation of power delivery which may generate high thermal stresses on CSP plant equipment.

Cloud transients may cause additional problems when a CSP is spread over a large geographic region, for example, 250 acres or more, because the incident flux on the receivers may not be uniform. This may result in a large variance in operating capacity of any receiver at any given time. Furthermore, CSP plants may have less stored energy in the system to handle load changes among receivers. It may also be very difficult to store energy overnight in the receivers without large losses.

SUMMARY

Exemplary system embodiments of a Multi-Receiver Manager (MRM) may comprise: a control processing unit comprising a processor and addressable memory, and the control processing unit may be configured to: predict at least one variable from at least one receiver model; predict at least one variable from a plant model; and determine at least one target by an optimizer, where the determined at least one optimizer target may be based on the predicted at least one variable from the at least one receiver model and the predicted at least one variable from the plant model. In additional system embodiments, there may be at least one receiver model for each receiver in a concentrated solar power (CSP) plant or there may be one receiver model for each grouping of receivers, and where each grouping of receivers may be based on a geographical region. In additional system embodiments, the at least one variable from the at least one receiver model may comprise steam flow and output temperature; where the at least one variable from the plant model may comprise main steam header pressure, unit load, and feedwater temperature; where the at least one target by an optimizer may be a receiver throttle target and a superheater target; and where the determined optimizer targets may be based on the predicted steam flow and predicted output temperature of the at least one receiver model and the predicted main steam header pressure, predicted unit load, and predicted feedwater temperature of the plant model. In additional system embodiments, the predicted steam flow and output temperature from the at least one receiver model may be based on at least one manipulated variable and at least one disturbance variable, where the manipulated variables may comprise at least one of: throttle demand with bias and superheater ratio demand, and where the disturbance variables may comprise at least one of: Direct Normal Irradiance (DNI), wind speed, superheater vent valve position, main steam stop valve position, main steam header pressure, feedwater flow, and feedwater temperature. In additional system embodiments, the plant model may be further configured to predict throttle bias, and the determined optimizer targets may be further based on the predicted throttle bias. In additional system embodiments, the predicted main steam header pressure, unit load, feedwater temperature, and throttle bias from the plant model may be based on at least one manipulated variable and at least one disturbance variable, where the manipulated variables may comprise at least one of: feedwater heater valve position demand and steam turbine generator (STG) throttle demand, and the disturbance variables may comprise at least one of: dump condenser bypass valve position, deaerator pegging steam valve position, plant and main steam piping system drain valve position, main steam piping temperatures at various points in the piping network, main steam piping pressures at various points in the piping network, steam flow from each receiver, main steam header temperature, and steam turbine generator status. In additional system embodiments, the control processing unit may be further configured to predict a steam outlet pressure at each receiver by the predicted main steam header pressure via a recursive calculation of main steam piping pressures at various points in the piping network. In additional system embodiments, the optimizer may be further configured to determine a steam turbine generator throttle target and a feedwater heater inlet temperature target, and the determined optimizer targets for the steam turbine generator throttle and feedwater heater inlet temperature may be based on the predicted steam flow and predicted output temperature of the at least one receiver model and the predicted main steam header pressure, predicted unit load, and predicted feedwater temperature of the plant model. In additional system embodiments, the determined optimizer targets may be further based on at least one process constraint configured to be individually controlled by a user, and the at least one process constraint configured to be individually controlled by a user may be an upper limit and a lower limit of at least one of: a throttle control on each receiver, a superheater ratio control on each receiver, a steam turbine generator (STG) throttle, and a feedwater heater temperature control valve. In additional system embodiments, the determined optimizer targets may be further configured to minimize at least one of: plant startup time, plant water usage, and plant trips, and the plant trips may be due to at least one of: instability from cloud transients, plant upsets due to full load rejection of the turbine, and depletion of stored energy. In additional system embodiments, the at least one variable from the at least one receiver model may comprise heat transfer fluid flow and output temperature; where the at least one variable from the plant model may comprise heat transfer fluid pressure, unit load, and feedwater temperature; where the at least one target by an optimizer may be a receiver throttle target and a heat transfer fluid outlet target; and where the determined optimizer targets may be based on the predicted heat transfer fluid flow and predicted output temperature of the at least one receiver model and the predicted heat transfer fluid pressure, predicted unit load, and predicted receiver outlet temperature of the plant model. In additional system embodiments, the predicted heat transfer fluid flow and output temperature from the at least one receiver model may be based on at least one manipulated variable and at least one disturbance variable.

Additional exemplary system embodiments may comprise a Multi-Receiver Manager (MRM) for a power generating plant with multiple solar receivers that may comprise: a control processing unit comprising a processor and addressable memory; where the control processing unit may be configured to: receive a command to initiate an operating scenario; and activate an operating scenario based on the received command, where the operating scenario may be at least one of: a plant startup, a plant running operation, and a plant shutdown. In additional system embodiments, the plant startup operating scenario may comprise commands by the control processing unit to: bias steam demand to at least one of the solar receivers; control overall throttle demand to match plant demand; and sequence a startup of the solar receivers, where the sequenced startup may be based on a production of steam of an acceptable quality and quantity from the biased steam demand and controlled overall throttle demand. In additional system embodiments, the plant running operation may comprise commands by the control processing unit to: determine targets for throttle demand; determine targets for superheater temperature; determine targets for main steam header pressure; determine targets for load demand; and manage upsets based on the determined targets for throttle demand, the determined targets for superheater temperature, the determined targets for main steam header pressure, and the determined targets for load demand. In additional system embodiments, the plant running operation may comprise commands by the control processing unit to: determine targets for throttle demand; determine targets for heat transfer fluid outlet temperature; determine targets for heat transfer fluid pressure; determine targets for load demand; and manage upsets based on the determined targets for throttle demand, the determined targets for heat transfer fluid temperature, the determined targets for heat transfer fluid pressure, and the determined targets for load demand. In additional system embodiments, the upsets may be due to at least one of: a loss of one or more components of the plant, a load rejection, and a cloud transient. In additional system embodiments, the plant shutdown operation may comprise commands by the control processing unit to: reduce feedwater temperature targets; reduce main steam header pressure targets; and sequence a shutdown of the solar receivers, where the sequenced shutdown may be based on an exhaustion of energy in the plant from the reduced feedwater temperature targets and the reduced main steam header pressure targets. In additional system embodiments, the plant shutdown operation may comprise commands by the control processing unit to: reduce heat transfer fluid temperature targets; reduce heat transfer fluid pressure targets; and sequence a shutdown of the solar receivers, where the sequenced shutdown may be based on an exhaustion of energy in the plant from the reduced heat transfer fluid outlet temperature targets and the reduced heat transfer fluid pressure targets.

The MRM may also be applied to a system using a single phase heat transfer fluid, such as molten salt or thermal oil. In these systems, the heat transfer fluid replaces steam in the receiver and associated distribution areas. Molten salt can be of a variety of compositions and may include sodium nitrate, potassium nitrate, lithium nitrate, sodium nitrate, potassium nitrite, lithium nitrate, and/or any other nitrate or nitrite blend. Typically for solar thermal applications, a composition of 60% Sodium Nitrate and 40% potassium nitrate may be used.

The single-phase heat transfer fluid may be stored in a thermal energy storage system where the fluid may be pumped from the thermal storage system and run to a steam generation system on demand. Alternatively, the heat transfer system may be directly coupled to a heat exchanger to generate steam for a steam turbine generator (STG).

Instead of controlling the receiver by the steam flow and outlet temperature, a receiver using a single phase heat transfer fluid may be controlled by variables such as minimum flow, receiver flow control valve position, receiver fluid outlet temperature, temperature difference across the receiver (delta-T), rate of change of temperature difference across the receiver, rate of change of the receiver outlet temperature, and/or fluid flow rate. These additional variables may be added to an optimizer to further predict throttle bias and optimizer targets.

One exemplary system embodiment may comprise a Multi-Receiver Manager (MRM) for a power generating plant with multiple heat transfer fluid solar receivers comprising: a control processing unit comprising a processor and addressable memory, the control processing unit configured to: receive a command to initiate an operating scenario; and activate an operating scenario based on the received command, where the operating scenario is at least one of: a plant startup, a plant running operation, and a plant shutdown. In other system embodiments, the plant startup operating scenario may comprise commands by the control processing unit to: bias heat transfer fluid demand to at least one of the solar receivers; control overall throttle demand to match plant demand; and sequence a startup of the solar receivers, where the sequenced startup may be based on a production of heat transfer fluid of acceptable temperature and quantity from the biased heat transfer fluid demand and controlled overall throttle demand. In other system embodiments, the plant running operation may comprise commands by the control processing unit to: determine targets for throttle demand; determine targets for heat transfer fluid outlet temperature; determine targets for heat transfer fluid temperature rise, determine targets for heat transfer fluid pressure; determine targets for load demand; and manage upsets based on the determined targets for throttle demand, the determined targets for heat transfer fluid temperature, the determined targets for heat transfer fluid pressure, and the determined targets for load demand. In other system embodiments, the upsets may be due to at least one of: a loss of one or more components of the plant, a load rejection, and a cloud transient. In other system embodiments, the plant shutdown operation may comprise commands by the control processing unit to: reduce inlet fluid temperature temperature targets; reduce main heat transfer fluid pressure targets; and sequence a shutdown of the solar receivers, where the sequenced shutdown may be based on an exhaustion of energy in the plant from the reduced heat transfer fluid inlet temperature targets and the reduced heat transfer fluid pressure targets.

BRIEF DESCRIPTION OF DRAWINGS

Embodiments are illustrated by way of example and not limitation in the figures of the accompanying drawings, in which.

DETAILED DESCRIPTION

Figure 1:
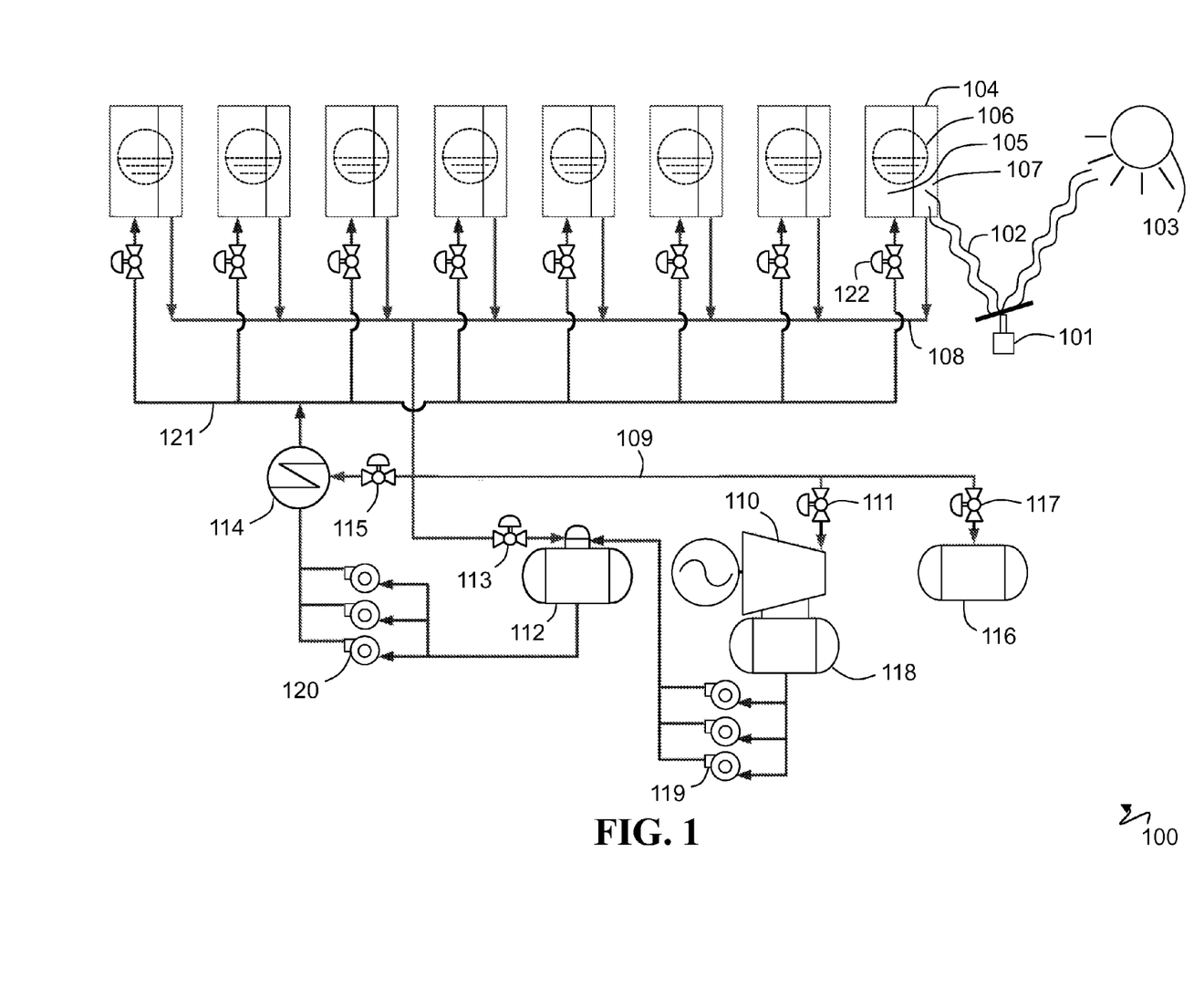
FIG. 1 depicts an exemplary multi-receiver standalone concentrated solar power (CSP) plant.

The design of an exemplary multi-receiver standalone concentrated solar power (CSP) plant 100 is shown in FIG. 1. A number of heliostats 101 focus sunlight, or flux 102, from the Sun 103 on a receiver 104, i.e., a solar receiver, in response to a throttle demand from the control system. Flux 102 may be concentrated in varying proportions on the evaporator panels 105, causing the evaporation of boiler feedwater, which may then be discharged into the vertical separator, or steam drum 106. From the steam drum 106, the steam may be heated above saturation temperature through the superheater panels 107. As steam flow increases, more heliostats 101 may be deployed to direct flux 102 toward the superheater panels 107 and away from the evaporator panels 105. Superheated steam may then be discharged into the main steam piping network 108 on its way to the main steam header 109. Depending on the CSP plant 100 conditions, steam may be discharged to the steam turbine generator (STG) 110 through a pressure control valve, i.e., the STG throttle valve 111; to the deaerator 112 through the deaerator pressure control valve 113; to the feedwater heater 114 through the feedwater heater pressure control valve 115; or to the dump condenser 116 through the dump condenser pressure control valve 117. Steam may be condensed to water in either the turbine condenser 118 or the dump condenser 116 and may then be returned to the deaerator 112 through the condensate pumps 119 or from a condensate storage tank (not shown). The feedwater pumps 120 pump boiler feedwater from the deaerator 112 through the feedwater heater 114 and back to the receiver 104 through the feedwater piping network 121. The feedwater flow control valves 122 on each receiver 104 modulate feedwater flow to match steam flow and maintain steam drum 106 level.

Figure 2:
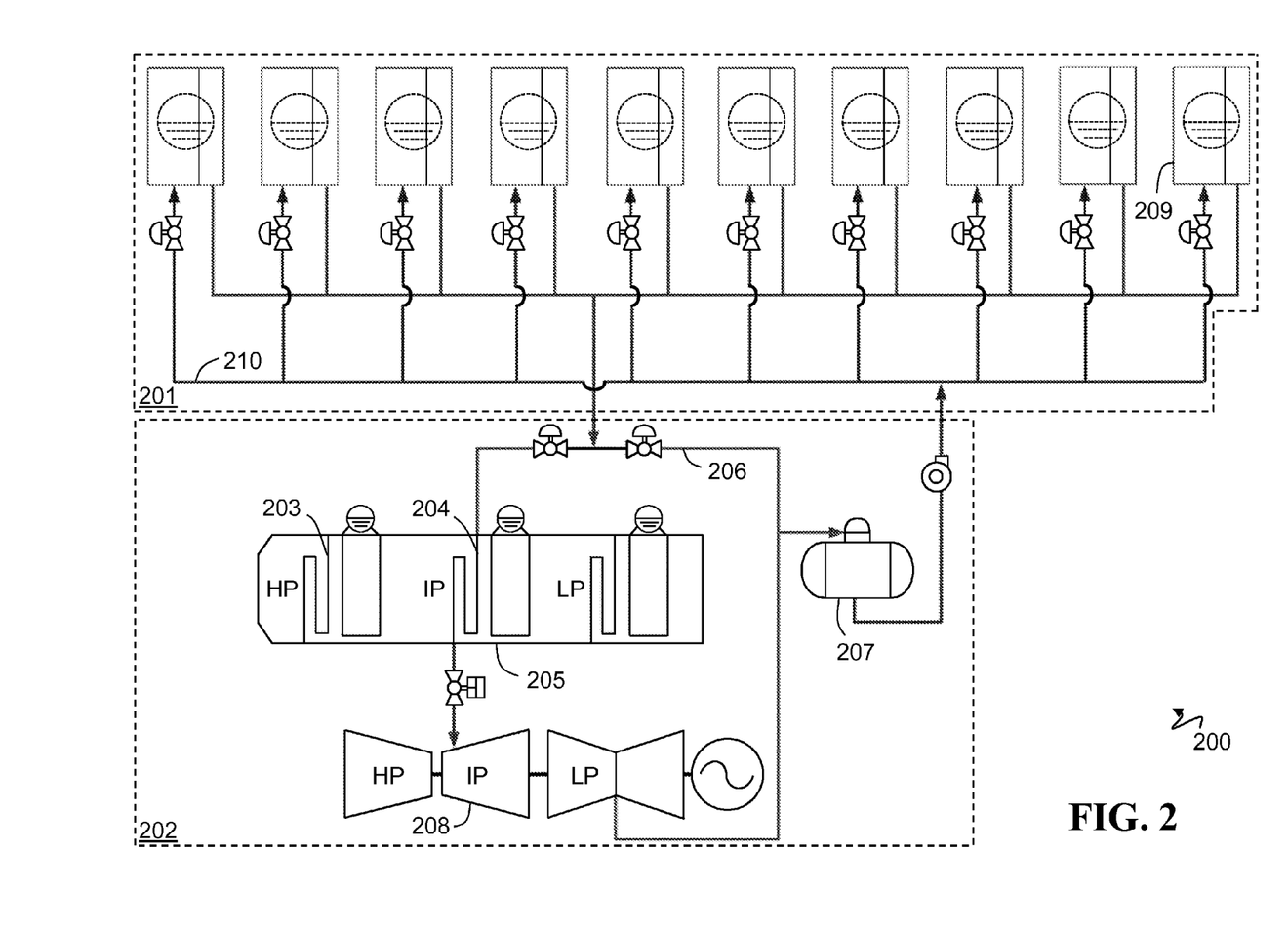
FIG. 2 depicts an exemplary multi-receiver concentrated solar power (CSP) plant integrated with a combined cycle fossil generation plant.

The design of an exemplary multi-receiver concentrated solar power (CSP) plant integrated with a combined cycle fossil generation plant, i.e., an integrated solar combined cycle technology (ISCC) plant 200, is shown in FIG. 2. In this embodiment, high pressure steam from the solar plant 201 may be sent to the power block 202 high pressure (HP) 203 or intermediate pressure (IP) 204 superheat section of the heat recovery steam generator (HRSG) 205 in the bottoming cycle. During plant startup, steam may be diverted to a bypass section 206 where it may be dumped to a condensate tank 207. This system may be used in either standalone or ISCC plant configurations. In a standalone plant, the STG 208 is driven only from steam produced by the solar field. In an ISCC plant, solar plant steam may be supplemented by steam production from a combined cycle plant.

There are three types of operating scenarios: a plant startup, a plant running operation, and a plant shutdown. In a plant startup, the Multi-Receiver Manager (MRM) (See FIGS. 3-4) may set one or more targets to optimize the time required to produce steam of a quality and quantity to either allow the STG 208 to synchronize to the grid in a standalone plant, or to send steam to the HP 203 or IP 204 superheater section of the HRSG 205 in an ISCC plant. The MRM may achieve optimized startup times by biasing steam demand to the receivers 209, controlling overall throttle demand to match plant demand, and sequencing the startup of individual receivers 209. The MRM may utilize a system to optimize the startup of a multi-receiver plant in the morning and optimize the shutdown at the end of the day. The system may achieve this optimization by controlling several plant factors to achieve operating goals. It may minimize the loss of water to venting as CSP plants may be typically located in arid, hot environments where water may be scarce. It may also balance the warmup of the piping network 210 among receivers 209 at varying distances from the power block 202. It may balance steam production with steam demand from the plant. It may have the plant begin to generate power as early as possible in the day. It may vary the ramp of the main steam header pressure setpoint in response to the normally rising and falling Direct Normal Irradiance (DNI), for example, up in the morning and down in the afternoon, which may allow the steam turbine to operate more efficiently by creating lower thermal stresses at lower loads. It may efficiently exhaust all available energy from the plant during plant shutdown.

During the plant running operation, i.e., the STG 208 being on grid or steam from the solar plant being sent to the HRSG 205, the MRM may manage upsets from any loss of components, load rejections, or cloud transients. The MRM may accomplish this by a system, which may accurately write targets for throttle demand, superheater temperature, main steam header pressure, and load demand to the distributed control system (DCS) or heliostat control system. The system manages the plant during the plant running operation and may provide quick, accurate, and stable responses to one or more changing conditions. The controls may be based on a receiver model in conjunction with a Model Predictive Control (MPC) for first-principles based multivariable control. This may provide accurate operating targets in the face of constantly changing plant and environmental conditions. If a receiver 209 is impaired or lost, the system may re-adjust loads to other receivers. If feedwater capacity or steam consumption capacity is reduced, the system may quickly reduce receiver steam production. The system may also bias throttle demand to each receiver 209 for optimal operating efficiency across the operational range of the plant; generate biased throttle demand targets for all receivers 209 to maintain the main steam header pressure setpoint or unit load demand; generate a biased aiming strategy for each receiver 209 to maintain the main steam header temperature setpoint; use stored energy in the receivers 209 and the piping system 210 to buffer the effects of sudden DNI changes; perform a coordinated control action on the steam generation system and steam turbine to match unit load demand with steam generation capacity and adjust both as necessary in response to upsets; and enforce setpoint ramp rates on key components to ensure smooth operation and to minimize thermal cycling. The system may also operate in base loading, turbine follow, receiver follow, and coordinated modes.

During the plant shutdown operation, the MRM system may exhaust all available energy from the plant to avoid overnight heat losses. This may be accomplished by a controlled reduction in feedwater temperature and main steam header pressure targets as written to the DCS.

Figure 3:
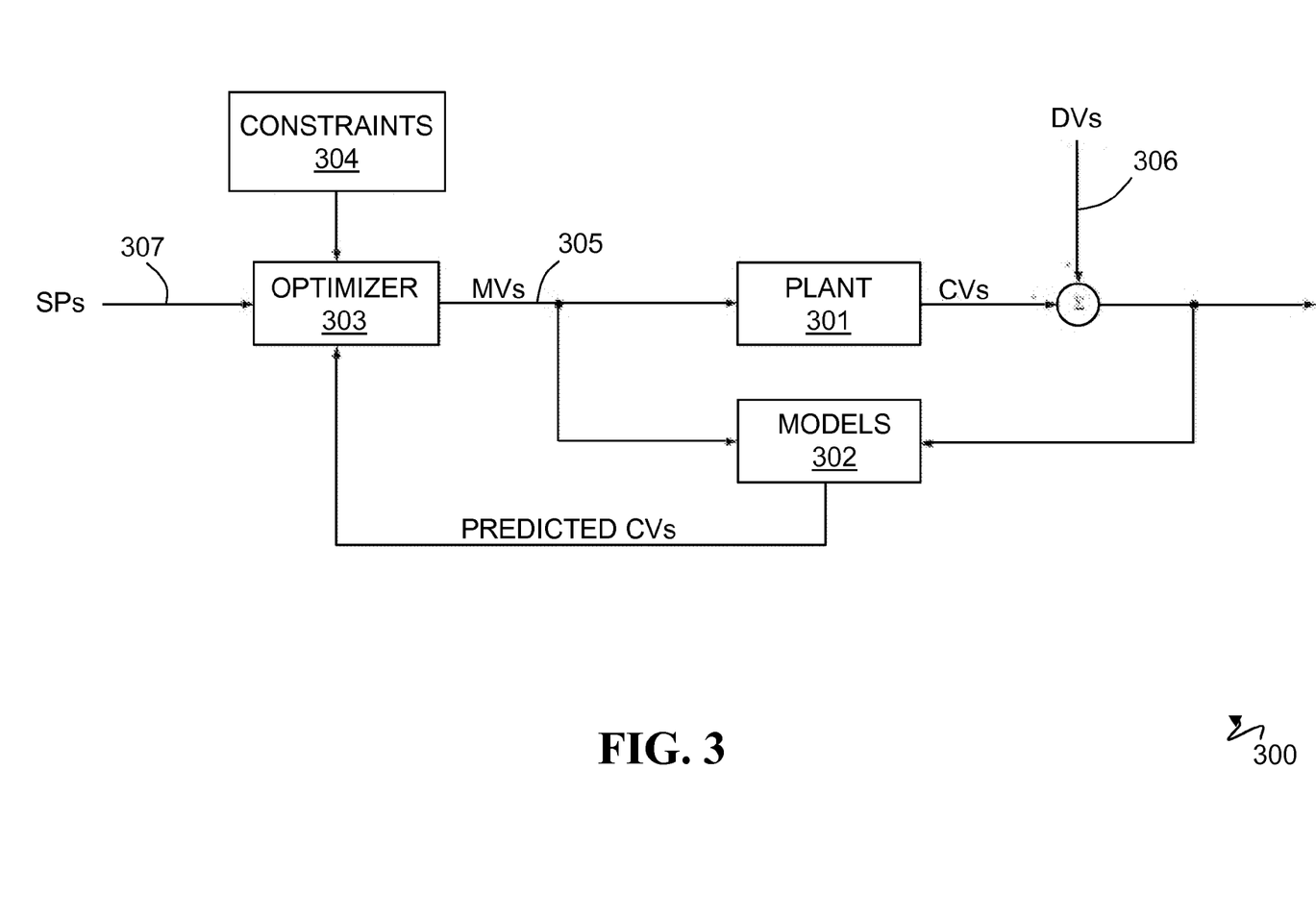
FIG. 3 depicts a functional block diagram of an exemplary Multi-Receiver Manager (MRM) system.

A functional block diagram of an exemplary MRM system 300 is depicted in FIG. 3. The MRM system 300 comprises a dynamic plant model 301, at least one dynamic receiver model 302, an optimizer 303, constraints 304, and setpoints 307. The at least one dynamic receiver model 302 accurately predicts steam flow and outlet temperature based on a number of manipulated variables (MVs) 305 and disturbance variables (DVs) 306. MVs 305 are input variables that may be adjusted dynamically to keep control variables (CVs) at their setpoints. DVs are variables that may cause the controlled variables to deviate from their respective setpoints (SPs). There may be as many as one receiver model 302 for each actual receiver (See FIGS. 1-2) in a CSP or ISCC plant. Alternatively, receivers may be grouped into each receiver model 302 based on one or more determinations, for example, a geographic region. The dynamic plant model 301 may accurately predict main steam header pressure, unit load, and feedwater temperature based on the MVs 305 and DVs 306. The optimizer 303 may determine and set receiver throttle and superheat targets, as well as STG throttle and feedwater heater inlet temperature targets based on the model inputs, SPs 307, DVs 306, and process constraints 304. The MRM system 300 may be implemented at the supervisory level. Outputs, i.e., CVs, may be written to the DCS as setpoints at 10 to 20 second intervals.

Figure 4:
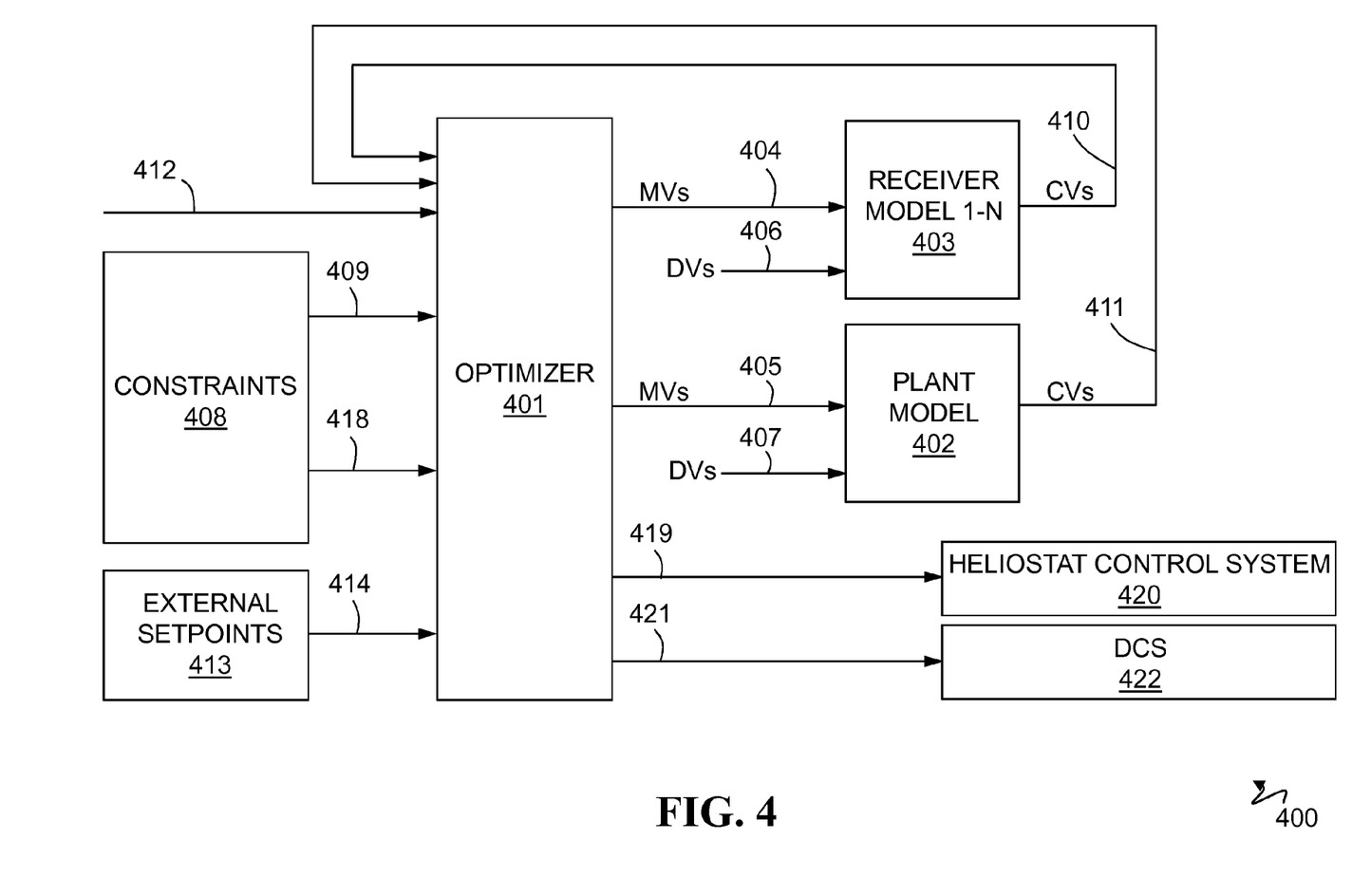
FIG. 4 depicts a more detailed functional block diagram of an exemplary Multi-Receiver Manager (MRM) system.

A more detailed block diagram of an exemplary MRM system 400 is depicted in FIG. 4. The MRM system 400 may comprise the Optimizer 401, the Plant Model 402, the at least one Receiver Model 403, MVs (404,405), DVs (406, 407), CVs (410, 411), Constraints 408, External Setpoints 413, and DCS operator selectable constraints released to MRM control from the DCS operator.

The Optimizer 401 may be used to minimize a cost function subject to a set of inputs 409 from Constraints 408, inputs 414 from External Setpoints 413, inputs 412, and CVs (410,411). The cost function may be developed not to optimize production, but rather to minimize one or more conditions. For example, the Optimizer 401 may be configured to minimize the plant startup time, i.e., the time from "first light" to the time on the grid, or the time to achieve an operating temperature, pressure, and flow; water usage; and the occurrence of plant trips, which may be caused by at least one of instability from cloud transients, plant upsets such as full load rejection of turbine, and excessive depletion of stored energy during cloud transients. The Optimizer 401 may use linear programming, quadratic programming, and/or mixed integer non-linear programming techniques to develop cost equations that minimize those conditions.

The inputs 412 to the optimizer 401 may include the actual superheater outlet temperature for each receiver, the actual steam flow for each receiver, the actual main steam header pressure, the actual unit load, the actual feedwater temperature, and the actual throttle bias for each receiver. These actual inputs 412 may be utilized by the Optimizer 401 with the predicted values of the CVs (410,411). The inputs 414 from the External Setpoints 413 to the Optimizer 401 may include the main steam header pressure and the unit load demand.

The dynamic plant model 402 and at least one dynamic receiver model 403 are part of the MRM system 400. These models (402,403) may accurately depict key components of a typical CSP plant, including the power block, piping network, and receivers. The power block may include a feedwater heater, deaerator, STG, dump condenser, control valves, and pumps. Receiver models 403 may depict steam flow and steam temperature based on inputs from MVs 404 and DVs 406. These models may be developed from a combination of first principles and empirical data. For standard equipment such as receivers and piping, models may be primarily developed from first principles. Since power block equipment, such as turbines and feedwater heaters, may incorporate widely differing designs from plant to plant, these models may make more use of empirical data. The models may, for example, be Multiple Input, Multiple Output (MIMO). The models may be dynamic to properly handle situations such as the plant startup and the occurrence of cloud transients. The models may be linear or non-linear. Linear models may be described in state-space representation. Non-linear models may be implemented using at least one of neural networks, heuristics, empirically derived polynomial equations, and first principles. The models may recursively solve for system boundary conditions using the values of disturbance variables downstream of nodes in a tree. For a desired outlet condition, controllers at various points in a network, such as a piping network, may specify desired input conditions to a plurality of points upstream of the present point, which in turn specify desired input conditions to a plurality of points further upstream in the network, until a system boundary condition at the input to the network is solved. One plant model 402 may be used for each system in conjunction with one receiver model 403 per receiver in the plant. In some embodiments, a plurality of receivers may use the same receiver model 403.

In the plant model 402, MV inputs 405 from the MPC may include the feedwater heater position demand and the STG throttle demand. CV outputs 411 may include predicted main steam header pressure, predicted unit load (MW), predicted feedwater temperature, and predicted throttle bias for each receiver. These predicted CV outputs 411 may be input into the Optimizer 401 along with the actual inputs 412. DV inputs 407 may include positions and status of all key steam sinks, piping temperatures, and main steam temperature. The plant model 402 may include the piping network interconnecting the power block with the various receivers. The plant model 402 may predict the desired outlet steam pressure at each receiver using the main steam header pressure. Predicting the desired outlet steam pressure at each receiver may comprise the approach of recursively solving for the steam pressure at various points within the piping network using the main steam header pressure and the pressure at other downstream points within the piping network. Temperature deviations and the status of drain valves may be used by the plant model to bias throttle demand to the various receivers. During plant startup outlying receivers have longer piping runs and may thus require higher throttle settings to achieve a balanced heatup of the plant piping network.

DV inputs 407 into the plant model 402 may include: the dump condenser bypass valve position, the deaerator pegging steam valve position, the plant and main steam piping system drain valve position, main steam piping temperatures at various points in the piping network, main steam piping pressures at various points in the piping network, steam flow from each receiver, main steam header steam temperature, and STG status.

MV inputs 404 into the receiver model 403 may include: throttle demand with bias for each receiver, and superheat ratio demand for each receiver. DV inputs 406 into the receiver model 403 may include: the DNI, the wind speed, the superheater vent valve position, the main steam stop valve position, the main steam header pressure, the feedwater flow, and the feedwater temperature. CV outputs 410 from the receiver model 403 may include: the predicted steam flow and the predicted superheater outlet temperature. These predicted CV outputs 410 may be input into the Optimizer 401 along with the actual inputs 412.

Additional logic may be used to manage the constraints 408 based on process inputs from the DCS. These constraints 408 may be input 409 to the optimizer. For example, steam flow must not be greater than plant feedwater capacity. Steam flow must not exceed plant capacity, which is especially important if plant capacity is suddenly impaired, such as when a full load rejection by the STG occurs. Steam demand is limited to total receiver capacity, which accounts for receivers not in MRM control, and thus the system may not able to respond to changes in steam flow demand for those receivers. Main steam header pressure must be within lower and upper bounds. Main steam header temperature must be within lower and upper bounds. STG throttle ramp rate for a load change must be within limits. Main steam header pressure ramp rate for a setpoint change must be within limits. Throttle ramp rate for each receiver must be within limits. Superheat ratio ramp rate for each receiver must be within limits. The predicted DNI must be within limits.

Several controls may be individually released 418 to the MRM control from the DCS operator. This may allow for a wide range of flexibility in the degree of control that the MRM exercises over the plant, rather than simply being on or off. Control of throttle on each receiver may be released to the MRM, which may continuously calculate steam flow capacity, i.e., upper and lower limits, based—in part—on receivers released to MRM control. The superheat ratio control on each receiver may be released to MRM, which may continuously calculate superheat temperature upper and lower achievable limits based on receivers released to MRM superheat ratio control. Additionally, STG throttle and the feedwater heater temperature control valves may be released to the MRM control.

Optimizer 401 outputs 419 to the Heliostat Control System 420 which may include the steam flow targets with bias for each receiver, and the superheat outlet temperature targets with bias for each receiver. Optimizer 401 outputs 421 to the DCS 422 which may include the STG throttle target and the feedwater temperature target.

There may be four operating modes of receiver-turbine controls from the MRM. These operating modes are based on the DCS enabling or disabling receivers and the STG for MRM control. The first exemplary operating mode may be where no receiver throttles are enabled from the DCS and the STG is not enabled, then the MRM is inactive and the plant operates in base loading mode. The second exemplary operating mode may be where the STG is enabled for MRM control but no receiver throttles are enabled, then the MRM uses turbine follow mode, where the STG throttle is adjusted to maintain header pressure. The third exemplary operating mode may be where the receiver throttles are enabled for MRM control but the STG is not, then MRM adjusts the throttle to maintain header pressure. The fourth exemplary operating mode may be where the STG and receiver throttles are enabled for MRM control, then MRM performs coordinated control of the receiver throttles and the STG throttle to maintain header pressure.

MRM may interface with the plant DCS using an architecture, e.g., Microsoft standard OLE for Process Control (OPC) architecture. The DCS interface may provide process variables including temperatures, pressures, flows, and operating states of key components. Data may be exchanged using tags, typically of type real or Boolean.

MRM systems may comprise a computing device embodiment where the computing device may comprise a processor, such as a central processing unit (CPU), addressable memory, an external device interface, e.g., an optional universal serial bus (USB) port and related processing, and an optional user interface and/or a display and/or a keyboard and/or a pointer-mouse system and/or a touch screen. Optionally, the addressable memory may, for example, be: flash memory, eprom, and/or a disk drive or other hard drive. These elements may be in communication with one another via a data bus. Via an operating system, such as one supporting a web browser and applications, the processor may be configured to determine an optimizer target based on at least one predicted variable from the a receiver model and at least one predicted variable from a plant model and where the processing unit comprising a processor and addressable memory may be configured to receive a command to initiate and activate an operating scenario based on received commands for a plant startup operation, a plant running operation, and a plant shutdown operation according to the exemplary embodiments described herein.

Operating Scenario: Standalone Plant

A standalone CSP plant includes receivers and a dedicated power block with an STG that runs exclusively off of solar produced steam. Thus, the CSP plant is started up and shut down daily in concert with the receivers. The following scenarios discuss operating strategies for standalone plants. Reference may be made to FIG. 1 for a schematic of a standalone plant.

An exemplary morning startup method may be to start all receivers simultaneously with all stop valves and drains open, allowing steam to heat the entire piping network to the power block. As piping heats up, the drains are closed progressively by the DCS from outlying areas toward the power block. The main consumers of steam at startup should be the feedwater heater and the deaerator. The main control problems are potentially an excess of saturated steam and a temperature imbalance in the piping network, potentially resulting in the back flowing of steam from hot piping to cold piping. MRM handles this by biasing throttle demand to the various receivers to maintain temperatures at various points in the piping network as close together as possible. The plant model predicts the rate of temperature change in the piping network to correctly bias the throttle. The result is that throttle demand is lower to nearby receivers than to receivers farther away from the power block. Additionally, overall throttle demand may be restricted by MRM at startup to match plant steam demand, especially prior to rollup of turbine. MRM restricts overall plantwide throttle demand to match steam demand to power block.

Another exemplary operating scenario is plant shutdown at the end of the day. The objective of MRM in a shutdown may be to both reduce main steam pressure in a controlled fashion-to minimize thermal stress on the receivers- and exhaust all available energy from the system since energy cannot effectively be bottled up overnight. MRM achieves these two shutdown goals by fixing STG throttle demand and allowing header pressure to decay at the end of the day. The MRM gradually lowers the feedwater temperature setpoint to some shutdown target, allowing the steam used to heat feedwater to go to the STG at the end of the day.

Operating Scenario: Standalone Plant

In a large solar field, a change in weather could impact plant operation. In these cases, the optimization variables may help to ensure that during weather changes operation of the receiver minimizes the equivalent thermal cycles that the receiver experiences. This can be done by minimizing the temperature change to the system, changing flow rates, adding or removing thermal input, or changing valve positions. Optimization of plant operation could entail keeping flow rates above a certain level, maximizing receiver outlet temperature, minimizing temperature change on a receiver, or ensuring a flow rate while keeping temperature outlet temperatures over set levels.

Operating Scenario: ISCC Plant

ISCC plants are traditional combined cycle plants that may take supplemental steam from a solar plant. Output from the solar plant is typically to the IP or HP superheat section of the HRSG (See FIG. 2).

Steam from the solar plant is typically sent to a bypass line during startup. Energy is expended to condense this steam. Accordingly, it is imperative for the solar plant to gain pressure and superheat temperature as quickly as possible during startup to be able to satisfy plant IP or HP steam requirements. In such scenarios, strategies similar to those outlined above for direct steam plants may be employed.

At running operation, when an upset occurs from a cloud transient, the optimizer function may calculate whether the plant could continue feeding the IP section of the HRSG or if it would have to go to bypass, and would adjust throttle accordingly. As with standalone plants, it would store energy in the solar plant piping network—in the form of pressure—ahead of the clouds, and would release it upon the clearing of the clouds. If switching to bypass was required, it would calculate a new throttle setting and vent steam as required to meet the much lower steam demand. A load rejection from the HRSG would result in similar action.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A Multi-Receiver Manager (MRM) system comprising:
 a control processing unit comprising a processor and addressable memory, the control processing unit configured to:
  predict at least one variable from at least one receiver model;
  predict at least one variable from a plant model, wherein the at least one variable from the plant model comprises a main steam header pressure;
  predict a steam outlet pressure at the at least one receiver model by recursively calculating the steam pressure at various points within a piping network of the MRM system using the predicted main steam header pressure; and
  determine at least one target by an optimizer, wherein the determined at least one optimizer target is based on the predicted at least one variable from the at least one receiver model and the predicted at least one variable from the plant model.

2. The MRM system of claim 1, wherein there is at least one receiver model for one or more receivers in a concentrated solar power (CSP) plant of the MRM system.

3. The MRM system of claim 1, wherein there is one receiver model for each grouping of one or more receivers, and wherein each grouping of the one or more receivers is based on a geographical region of a concentrated solar power (CSP) plant.

4. The MRM system of claim 1 wherein the at least one variable from the at least one receiver model comprises a steam flow and an output temperature; wherein the at least one variable from the plant model further comprises a unit load, and a feedwater temperature; wherein the at least one target by an optimizer is a receiver throttle target and a superheater target; and wherein the determined optimizer targets are based on the predicted steam flow and predicted output temperature of the at least one receiver model and the predicted main steam header pressure, predicted unit load, and predicted feedwater temperature of the plant model.

5. The MRM system of claim 4, wherein the predicted steam flow and output temperature from the at least one receiver model are based on at least one manipulated variable and at least one disturbance variable, wherein the at least one manipulated variable comprises at least one of: a throttle demand with bias and a superheater ratio demand, and wherein the at least one disturbance variable comprises at least one of: a Direct Normal Irradiance (DNI) value, a wind speed, a superheater vent valve position, a main steam stop valve position, the main steam header pressure, a feedwater flow, and the feedwater temperature.

6. The MRM system of claim 4, wherein the plant model is further configured to predict a throttle bias, and wherein the determined optimizer targets are further based on the predicted throttle bias.

7. The MRM system of claim 6, wherein the predicted main steam header pressure, unit load, feedwater temperature, and throttle bias from the plant model are based on at least one manipulated variable and at least one disturbance variable, wherein the at least one manipulated variable comprises at least one of: a feedwater heater valve position demand and a steam turbine generator (STG) throttle demand, and wherein the at least one disturbance variable comprises at least one of: a dump condenser bypass valve position, a deaerator pegging steam valve position, a plant and main steam piping system drain valve position, main steam piping temperatures at various points in the piping network, main steam piping pressures at various points in the piping network, steam flow from each receiver model, a main steam header temperature, and a steam turbine generator status.

8. The MRM system of claim 4, wherein the optimizer is further configured to determine a steam turbine generator throttle target and a feedwater heater inlet temperature target, and wherein the determined optimizer targets for the steam turbine generator throttle and feedwater heater inlet temperature are based on the predicted steam flow and predicted output temperature of the at least one receiver model and the predicted main steam header pressure, predicted unit load, and predicted feedwater temperature of the plant model.

9. The MRM system of claim 4, wherein the determined optimizer targets are further based on at least one process constraint configured to be individually controlled by a user, and wherein the at least one process constraint configured to be individually controlled by a user is an upper limit and a lower limit of at least one of: a throttle control on each receiver, a superheater ratio control on each receiver, a steam turbine generator (STG) throttle, and a feedwater heater temperature control valve.

10. The MRM system of claim 4, wherein the determined optimizer targets are further configured to minimize at least one of: plant startup time, plant water usage, and plant trips, and wherein the plant trips are due to at least one of: instability from cloud transients, plant upsets due to full load rejection of the turbine, and depletion of stored energy.

11. A Multi-Receiver Manager (MRM) system for a power generating plant with multiple solar receivers comprising:
a control processing unit comprising a processor and addressable memory; the control processing unit configured to:
receive a command to initiate an operating scenario; and
activate an operating scenario based on the received command, wherein the operating scenario is at least one of: a plant startup operation, a plant running operation, and a plant shutdown operation, wherein the plant running operation comprises commands by the control processing unit to:
determine targets for main steam header pressure;
predict a steam outlet pressure by recursively calculating the steam pressure at various points within a piping network of the MRM system using the determined targets for the main steam header pressure.

12. The MRM system of claim 11, wherein the plant startup operation comprises commands by the control processing unit to:
bias a steam demand to at least one of the solar receivers;
control an overall throttle demand to match a plant demand; and
sequence a startup of the solar receivers, wherein the sequenced startup is based on a production of steam of a particular quality and quantity from the biased steam demand and the controlled overall throttle demand.

13. The MRM system of claim 11, wherein the plant running operation further comprises commands by the control processing unit to:
determine targets for throttle demand;
determine targets for superheater temperature;
determine targets for load demand; and
manage upsets based on the determined targets for throttle demand, the determined targets for superheater temperature, the determined targets for main steam header pressure, and the determined targets for load demand.

14. The MRM system of claim 13, wherein the upsets are due to at least one of: a loss of one or more components of the plant, a load rejection, and a cloud transient.

15. The MRM system of claim 11, wherein the plant running operation comprises commands by the control processing unit to:
determine targets for throttle demand;
determine targets for heat transfer fluid outlet temperature;
determine targets for heat transfer fluid pressure;
determine targets for load demand; and
manage upsets based on the determined targets for throttle demand, the determined targets for heat transfer fluid temperature, the determined targets for heat transfer fluid pressure, and the determined targets for load demand.

16. The MRM system of claim 15, wherein the upsets are due to at least one of:
a loss of one or more components of the plant, a load rejection, and a cloud transient.

17. The MRM system of claim 11, wherein the plant shutdown operation comprises commands by the control processing unit to:
reduce feedwater temperature targets;
reduce main steam header pressure targets; and
sequence a shutdown of the solar receivers, wherein the sequenced shutdown is based on an exhaustion of energy in the plant from the reduced feedwater temperature targets and the reduced main steam header pressure targets.

18. The MRM system of claim 11, wherein the plant shutdown operation comprises commands by the control processing unit to:
reduce heat transfer fluid temperature targets;
reduce heat transfer fluid pressure targets; and
sequence a shutdown of the solar receivers, wherein the sequenced shutdown is based on an exhaustion of energy in the plant from the reduced heat transfer fluid outlet temperature targets and the reduced heat transfer fluid pressure targets.

* * * * *